Feb. 19, 1929.

A. F. G. LUCAS ET AL 1,702,477

LUBRICATOR

Filed Feb. 26, 1925    5 Sheets-Sheet 1

Feb. 19, 1929.
A. F. G. LUCAS ET AL
LUBRICATOR
Filed Feb. 26, 1925

Patented Feb. 19, 1929.

1,702,477

UNITED STATES PATENT OFFICE.

ANTHONY F. G. LUCAS AND EDWARD E. CLEMENT, OF WASHINGTON, DISTRICT OF COLUMBIA; SAID CLEMENT ASSIGNOR TO SAID LUCAS.

LUBRICATOR.

Application filed February 26, 1925. Serial No. 11,853.

My invention has for its object the distribution of lubricating oil to one or more points of consumption, such as pits in the service station, in such manner as to maintain absolute purity of the oil up to the point of inflow into the engine crank case or other container or bearing; to maintain said oil at all times under proper conditions to flow and be handled easily, including the maintenance of an approximately constant temperature; to keep the main supply of oil, preferably in the original containers in an enclosure not accessible to those who draw upon it; and to record or meter the same as it is drawn off both in said inclosure and at the point of consumption. Ancillary objects are to provide automatic means for handling measured bodies of oil at an intermediate point in the supply lines, and controlling the same from the discharge nozzle with incidental metering.

In order to attain our objects we employ a supply house or warehouse which can be enclosed, and in which we maintain storage vessels containing oil or similar lubricant, special means being provided to apply the containers to a system of piping which extends to the pits or points of consumption, a gauge being provided for each container, a common gauge for the general supply system of piping, and finally a visible gauge for the measuring cylinder through which the oil passes from the pipe line to the discharge nozzle. The supply and discharge to and from said measuring cylinder are automatically controlled by electric contacts on the discharge nozzle, which are opened and closed automatically by the operator in opening and closing the nozzle valve. Said supply contacts in one position close a circuit which causes the opening of the pipe line to the measuring cylinder, and in the other position open said circuit, so as to reverse the valve connections, and close the pipe, and connect the measuring cylinder to the discharge nozzle. A float in the measuring cylinder, working against other electrical contacts opens said supply controlling circuit when the measuring cylinder is full and in another form may also close the same when the cylinder is emptied, thereby obviating the necessity for any contacts on the discharge nozzle.

Provision is made for drawing a full stream, as when oil is to be supplied to a crank case, or a very small quantity, as when it is to be used for filling oil cups and the like. These and other points will sufficiently appear from the detailed description hereinafter.

In the accompanying drawings forming a part of this application,

Fig. 1ª is a longitudinal section on the line 3—3 of Fig. 1, showing two of the pits in transverse section, and beneath the runway with the collecting pipe for the main receiving tank.

Fig. 3ª is a longitudinal section on line 19—19 of Fig. 3, of one pit, showing heating and other pipes, and flooring arrangements.

Figs. 5ª, 5ᵇ, 5ᶜ and 5ᵈ show modified nozzle arrangements.

Figures 1, 1A:
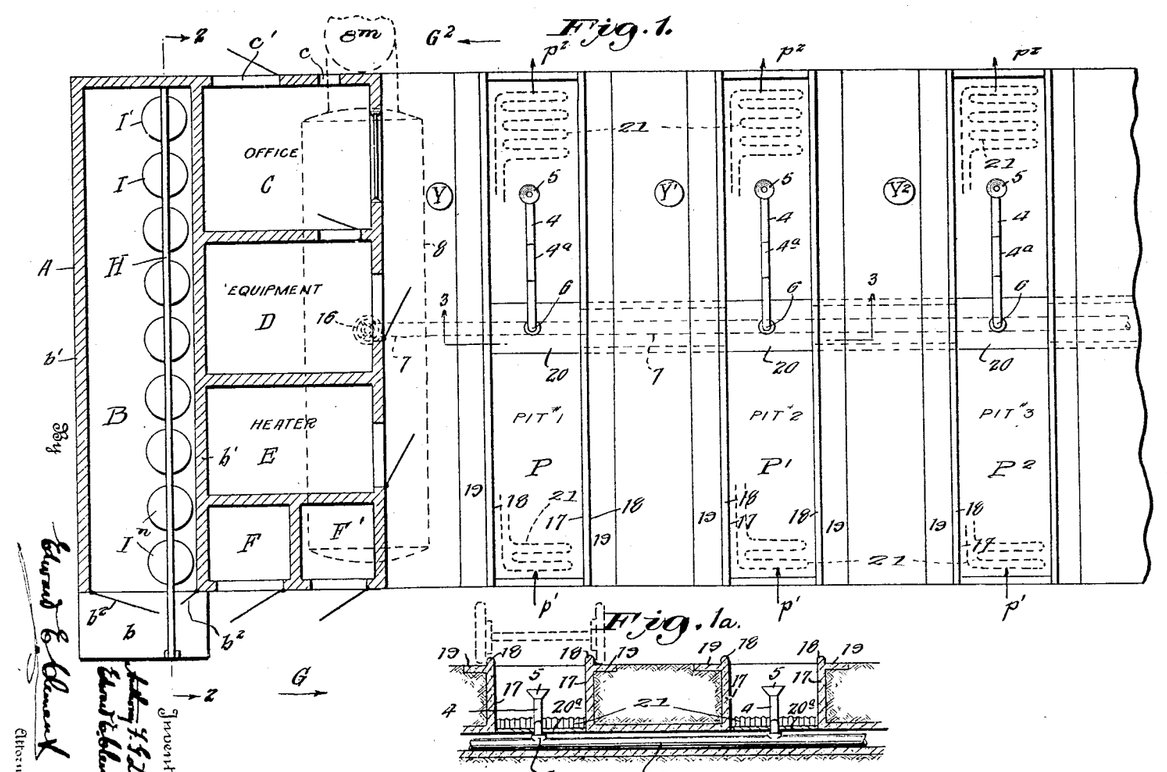
Fig. 1 is a diagram of a service plant embodying the invention, with three pits equipped, office, storage and service capacity for nine drums of oil or grease.
Figure 2:
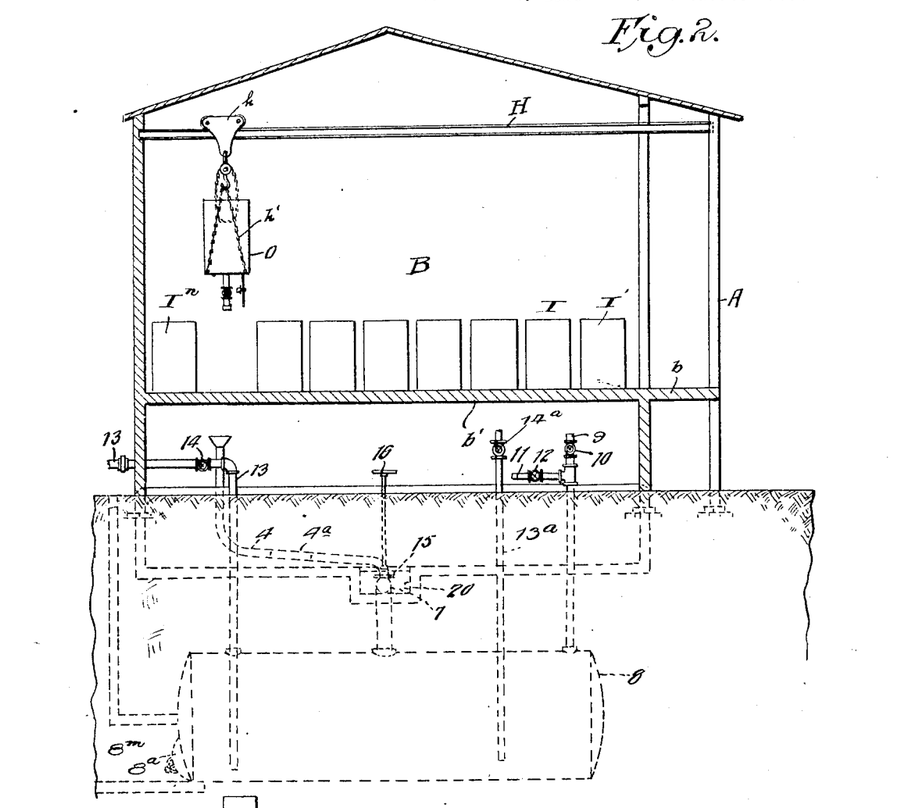
Fig. 2 is a transverse section on the line 2—2 of Fig. 1 looking in the direction of the arrows.

Referring to the drawings, and especially to Figs. 1 and 2, the general layout is for a plant having three or more pits, each adapted to receive one car. The cars enter by the driveway G, or directly from the side if space permits, and cross the pits in the direction of the arrows $p'$, leaving the pits as indicated by arrows $p^2$, and thence passing out by driveway $G^2$. Each pit is equipped with a drain pipe 4 for cylinder oil, having a terminal funnel 5 adapted to be adjusted beneath the drain valve of the crank case of the car. For purposes of adjustment each pipe preferably has a slide joint $4^a$ and a swinging connection or swivel coupling 6 with the trunk drain pipe 7, which passes with a suitable fall beneath the pits to the receiving tank 8, said tank being sunk in the ground to a sufficient depth to satisfy underwriters' requirements and also to ensure complete drainage of the pipes. The tank 8 is shown in the drawings as located partly beneath one foundation of the building A, but in practice would be between the building and the first pit, or beneath the driveway, so as to be accessible. Its location in Fig. 1 is due to lack of space on the sheet, and may be varied without departing from the invention. This tank is provided with a vent 9 controlled by a valve 10; air pressure pipe 11 controlled by valve 12; a discharge pipe 13, controlled by valve 14, and a valve 15 for the trunk pipe 7, controlled by hand wheel 16. The pits P are arranged parallel with each other, and are approximately 4 x 20 feet in size, lined with concrete or brick 17 as best shown in Fig. $1^a$, and provided with raised flanges 18 and wheel tracks 19, preferably integral with the lining walls. Car wheels pass over the tracks 19 outside flanges 18, as shown in dotted lines in Fig. $1^a$. The pits are approximately four feet deep, and crossing them centrally from end to end of the plant is a lined duct 20, in which the trunk drain 7, the oil and grease trunk pipes and the heating pipes are laid, as well as the conduits for electric light wires. Between pits this duct 20 is arched over and covered, and in the pits it has floor boards or other suitable coverings as indicated at $20^a$ in Fig. $1^a$. The pits P are heated by means of steam or hot water radiators indicated at 21, the supply pipes for which are carried through duct 20 to the heater chamber E, which for the sake of simplicity is not shown in Fig. 2, but which extends down considerably below the level of the pits, so as to have a fall therefrom for purposes of back flow or drainage in the hot water or steam piping system. Neither ashes nor coal is required to be handled, as heat is furnished by the consumption of the waste cylinder oil collected in the tank 8, and supplied therefrom to the heating plant under pressure in a manner presently to be described. The specific details of the heating plant are not germane to the present invention, as any approved form of heat may be employed, even including hot air and electrical heaters. The main point however is the heating of the pits, so as to maintain a working temperature therein for the men at all seasons of the year. Another point in having the pits heated as indicated is that the temperature of the grease and oil may be maintained approximately constant, regardless of external conditions. An incidental purpose is to assist in warming the bearings and metals of a chassis in cold weather, before and during the injection of the grease. When the pit is open the heat can be turned off or turned down, but when it is in use there should be sufficient heat rising to measurably raise the temperature of all metals on the chassis within a few minutes. This is an advantage which will be appreciated by those skilled in the art who are acquainted with the behavior of cold bearings and cold grease.

Figures 3, 3A:
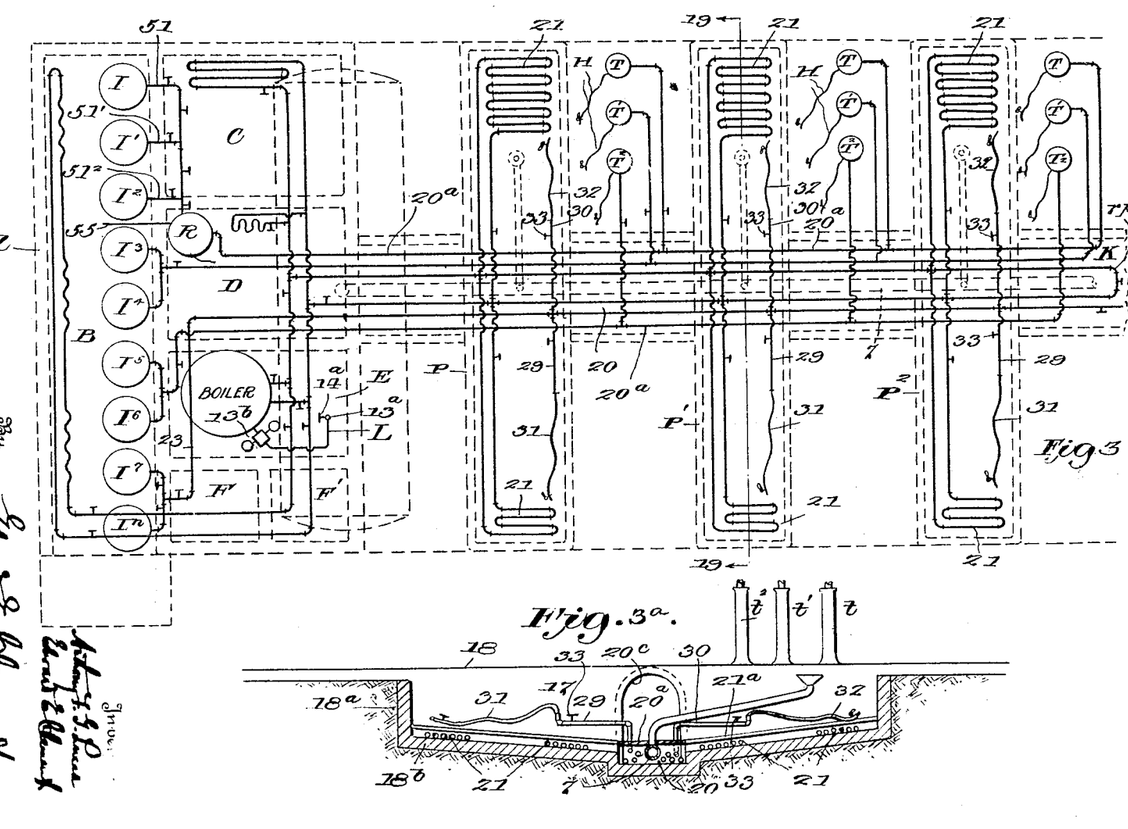
Fig. 3 is a diagram of the piping layout for the general system, with three pits equipped.

Details of the drainage of the pits P and the central duct 20 are not shown, but it may be stated in passing that the duct 20 should have a fall or incline from end to end, and at the lower end should be connected with a tank or other drainage receptacle; while each pit bottom should have a drop or incline from both ends towards the duct 20 in the middle to ensure drainage into the gutter as shown in Fig. $3^a$. As all the pipes and wires in this duct are either metal or metal enclosed, the duct and the pits can be kept clean by flushing out with a hose. The arrangement of the drainage pipes 4 and the detailed construction of the greasing appliances to be hereinafter described are such that little or no oil or grease should ever fall within a pit, and if such there be, it can readily be removed with a sponge or waste in the ordinary manner or being warmed on the metal floors it will flow readily into the duct 20.

At the end of the row of pits, preferably the end toward the street if the plant be located on a narrow lot, is a building A, containing a chamber B for the drums of oil and grease to be supplied to the pits, an office C, equipment and store room D, heater room E and retiring rooms FF. The chamber B is entirely enclosed by fireproof walls $b'$, and fireproof doors $b^2$, the latter being shaped and recessed to permit closing around the overhead rail H carrying the trolley $h$ and hoist $h'$ by means of which the drums of oil and grease I—$I^n$ are placed in position. The floor of the chamber extends out beyond the doors at $b$ and the rail H extends out over the platform thus formed, to permit loading and unloading on the platform $b$, preferably from the street, so that trucks need not obstruct the driveways or the pits. The location and arrangement of the drums is diagrammatically illustrated in Figs. 1 and 2, details of the piping connections being shown in Figs. 3 and $3^a$. The apparatus and methods described are peculiarly applicable to what is known as "600W", which has been a standard lubricant for engines, particularly for steam engines for many years. This lubricant is a thick and viscous oil, having specifications such as to make it extremely desirable for motor vehicles except in one respect, that it is almost black in color and is very subject to oozing and leakage. By our present system, methods and apparatus, the use of 600W is rendered possible without leakage or fouling of the plant, or waste.

Figure 4:
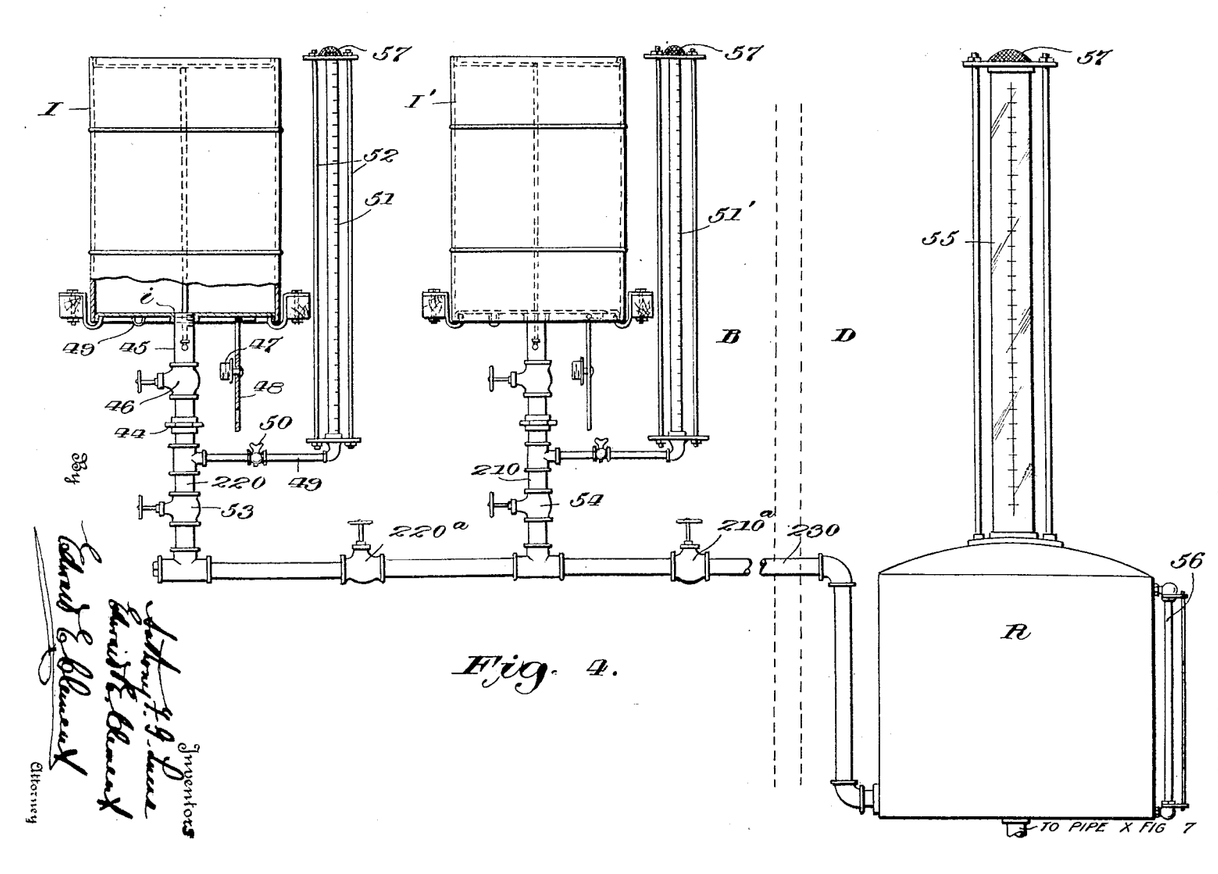
Fig. 4 is a diagram showing an arrangement of piping, control valves, and sight feed or indicator columns for oil or grease drums, the piping from the drums being taken through a reservoir and thence to the dispensing hose.

Referring now to Fig. 4, pipe 230 is supposed to lead along beneath the platform $b'$ of Fig. 2, and to a reservoir R which may be located in any convenient place, but must be at a lower level than the drums I—I'. The pipe 230 has valves 210 and 220, the branch pipes 210 and 220 leading to the respective drums. Each of these drums which are shown herein as standard for both oil and grease, is of rolled sheet steel in cylindrical form, stiffened by annular flanges and provided with countersunk heads, only one of which is made with an opening. This is in order to lessen the chances of refilling and resale of the drums by unauthorized persons, and to make it more difficult to remove oil or grease from the drums in transit or otherwise except in an authorized plant. The pipe 220 is fitted with a union coupling 44 by which a short section of tube 45 can be joined to the pipe 220 and thereby connect in the drum I. The section 45 is screwed into the tapped opening $i$ in the drum I and is provided with a valve 46. When this section of pipe is removed, the opening in the drum head is closed by means of a plug 47 secured to hasp 48 the end of which when the plug is secured in place, engages a riveted staple 49, whereby a padlock or a lead seal may be applied to prevent unauthorized removal of the plug 47. This plug may be sealed in place by other means if desired, the main object being to make the manufacturer of the grease responsible to the dealer who dispenses it, and the dealer in turn responsible for both himself and the manufacturer to the customer. This enables us to attain our object of guaranteeing the delivery to the customer of oil or grease exactly as it leaves the hands of the manufacturer, without contamination, adulteration or substitution.

The pipe 220 is provided with a lateral arm 49 containing a valve 50 and carrying the sight tube 51, the same being a graduated glass column carried in a frame 52 and when the valve 46 is open, indicating at all times the level of the oil in drum I, attached to its pipe 22. It should be noted that this pipe 220 also has a valve 53, and the pipe 210 has a similar valve 54 the purpose of which is to prevent drainage of the sight tubes when the drums are being changed, as well as to cut off the entire branch leading to any particular drum when necessary.

It will be observed in Fig. 2 that the pipes 23 connect the drums in pairs except the last three, which form a triplet. We have assumed that in the average plant two drums will be sufficient for each particular brand or quality of oil or grease, and with the arrangement shown in Fig. 4, it would be possible to use a single drum, since the reservoir R will always hold enough oil or grease to supply the pits while the drum I or I' is being changed. This reservoir R is common to as many drums as are connected to the same feed pipe 230, and is shown equipped with a sight tube indicator 55 for the entire system, and with a separate sight tube indicator 56 for itself. It will be observed that the upper ends of the several columns 51, 51' and 55 are open at the top, and each one is covered with a screen 57 to keep out foreign substances. This means that the system is worked at atmospheric pressure. As will presently appear, however, this may be varied, especially with respect to the grease or thick oil, while the light or thinner lubricating oils may be handled by the arrangement of Fig. 4.

Figure 5:
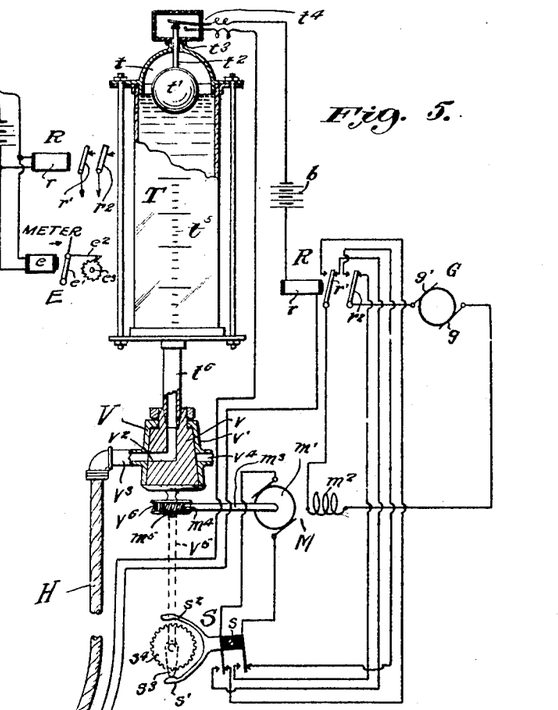
Fig. 5 is a diagram with parts in section, showing an oil hose, measuring tank, controlling valve therefor, electrical drive for the controlling valve, and combined nozzle and tank control for said drive. The feed pipe in this figure is supposed to be connected to the discharge pipe from the reservoir in Fig. 4.

Fig. 5 is a diagrammatic view of an automatic arrangement for supplying oil. The glass tank T is shown containing the oil and having graduations on its side for denoting the quantity of oil therein. It is connected by the pipe $t^6$ to the valve V shown in section. The valve plug $v$ is adapted to turn in the casing $v'$ so that the passage $v^2$ may connect the tank with either the nipple $v^3$ leading to the hose H or the nipple $v^4$ leading to a source of supply, which are arranged in opposite sides of the casing, and hereinafter more fully described. A stem $v^5$ is fixed in the plug so as to extend downwardly and turn the same. Near the top of the stem a worm gear $v^6$ is fixed and adapted to mesh with a worm $m^5$ on the shaft $m^4$ of a motor M so that the turning of the valve plug may be effected by the turning of the motor armature $m'$ either directly or in reverse. A reversing switch S is arranged below the valve and is shown pivoted at $s$ and having anchor arms $s'$ and $s^2$ adapted to be acted upon alternately by a cam projection $s^3$ which is actuated and controlled by the valve stem $v^5$. The movement of the motor and valve is controlled by means of the relay R which comprises an electromagnet $r$ and armature contacts $r'$ and $r^2$ included in series with the contacts of the reversing switch S and with a generator G for supplying current to the motor. The relay is energized from a battery $b$ in series therewith.

Figure 8:
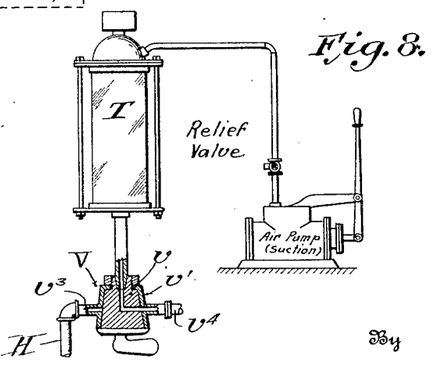
Fig. 8 is a diagrammatic figure showing the application of suction or vacuum feed means to the dispensing tank.

The tank T is shown partly broken away to show the float $t'$ having a stem $t^2$ extending vertically upwardly from the top of the same through a collar $t^3$ in the dome of the tank. A spring contact $t^4$ is provided above the tank in series, in the relay circuit, and is adapted to be opened by pressure of the tip of the stem $t^2$ when the float $t'$ is in the upper part of the tank, by reason of the oil level reaching the point which it will upon the tank being full. It should be noted in passing that the upper part of the tank may be provided with suction or vacuum feed means as shown in Fig. 8 for aid in feeding the same.

A valved nozzle $h$ is fitted at the end of the hose H for controlling the flow of the oil therefrom. A switch $h'$ is fixed to the bottom of the nozzle and adapted to be opened and closed by the turning on and off respectively of the oil, i. e. with the turning of the valve in the nozzle. When the nozzle and switch are closed as shown, and the tank is full and all the other parts are in position as shown, this is the normal position of the apparatus when not in operation.

When the operator opens the valve $h$ and discharges the oil, the float $t'$ will consequently drop as the oil leaves the tank and the contact $t^4$ will automatically close; the pressure of the stem tip of the float having been relieved. By the graduations $t^5$ on the tank, the amount of oil taken therefrom will be readily ascertainable. Upon closing the nozzle $h$ the switch $h'$ will be closed and the relay circuit thereby made complete as follows: from the battery $b$ the current will pass to the relay magnet $r$, to the switch $h'$ and then to the contact $t^4$ (now closed) and back to the other terminal of the battery. The relay magnet will thereupon be energized, its armatures attracted to the opposite position of that one shown in the drawing and the motor circuit will be as follows: from the terminal $g$ of the generator the current will pass through the field winding $m^2$ of the motor M, to the relay armature $r'$ to the contact opposite the one shown touching the same in the drawing, to the reversing switch S, to the armature winding $m'$, back to the reversing switch, to the relay armature $r^2$ and to the other terminal $g'$ of the generator. The circuit being thus complete, the motor is energized and by the rotating of its armature acting in cooperation with the shaft $m^3$, the worm $m^4$ and the worm gear $m^5$, the valve plug will be turned so that the passage $v^2$ will be positioned next to the nipple $v^4$ thereby permitting the tank to be refilled from the source of supply. As soon as the valve plug has been turned 180 degrees in the casing to the position just described, the cam $s^3$ will also have traveled 180 degrees and will strike the other arm $s^2$ of the anchor of the reversing switch and by thus throwing the same over the motor circuit will be broken and the armature, gears and valve will remain at rest in the new position. When the tank has again become full the float will have risen with the liquid level and the tip of its stem will force open the spring contact $t^4$, thereby opening the relay circuit, deenergizing the relay magnet and resulting in the armatures $r'$ and $r^2$ falling back to their normal position (as shown in the drawing). By these means the reverse circuit of the motor will have been completed and the current will pass as follows: from the generator terminal $g$ to the field winding $m^2$, to the relay armature $r'$, to the contact shown touching it in the drawing to the reversing switch S which is now thrown over in opposition position to the one shown; through the armature winding $m'$ back through the reversing switch to the contact opposite the one now shown touching it in the figure, to the relay $r^2$ (as shown) and to the contact $g'$ of the generator. The motor being energized, reverse movement of the armature will thereby be effected and through the cooperating shaft, worm and gear, the valve will be reversed to its original position as shown in the drawing. The cam $s^3$ travelling with the valve will upon having turned 180 degrees strike the anchor arm $s'$ and throw the reversing switch back into its original position as shown in the drawing thereby breaking the motor circuit and causing the armature and connected parts to come to rest in their original normal positions as shown in the drawing. Thus the operation may be repeated at will in the same manner, the tank being automatically refilled with oil and the valve being automatically actuated as described.

Figure 6:
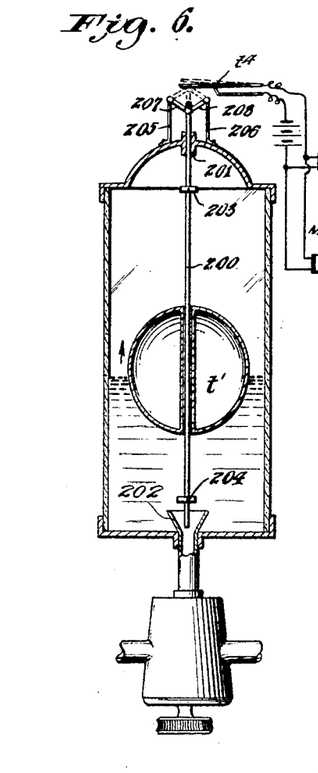
Fig. 6 is a supplemental figure showing the measuring tank of Fig. 5 equipped with full automatic control.

In Fig. 6, is shown a modification of the tank arrangement and the relay of Fig. 5. The stem 200 is so constructed as to pass down the center of the tank and through the float $t'$ which is adapted to slide up and down on the same. The stem is held in place by collar 201 and funnel 202. Collars 203 and 204 (preferably adjustable) are fixed to the stem, near the upper and lower ends of the same within the tank so that when the tank is full the float will strike the upper collar 203 and raise the stem and when the oil has been removed from the tank, the float will strike the lower collar 204 and force the stem downward. On the top of the tank spring leaves 205 and 206 are arranged on opposite sides of the stem with toggle arms 207 and 208 pivotally connected to their upper ends, to a point immediately below the tip, on the stem. The spring contact $t^4$ is arranged as in Fig. 5 so that it is in closed position when the stem is down but will be opened by the tip of the stem when the same is raised by the action of the float. By means of the spring leaf toggle arrangement it will be seen that the stem will remain in the last position into which it has been forced by the float, until by reason of the float having travelled along the stem either from the lower to the upper collar or vice versa, it is forced into opposition position. By this arrangement (as distinguished from that of Fig. 5) the relay and a fortiori the motor and valve are entirely controlled by the spring contact $t^4$ (eliminating the nozzle control switch $h'$ but leaving all the other parts as shown in Fig. 5) the position of the switch not being changed unless the oil in the tank falls to its lowest level or rises to the highest (i. e. remaining as left, whether made or broken, while the float is traveling up or down the stem).

For measuring the number of times the tank is filled a meter E may be arranged in the circuit with the relay. This may be of simple construction as shown in the drawing, consisting of an electromagnet $e$, in parallel with the relay magnet $r$ so as to be energized whenever the latter is energized, and having an armature $e'$ controlled thereby and acting on a stepping pawl $o'$ pivotally connected with the armature and adapted to engage with and intermittently turn the ratchet wheel $e^3$, which may be connected with an ordinary meter (not shown) for recording the number of movements.

Figures 5A, 5B, 5C, 5D, 7:
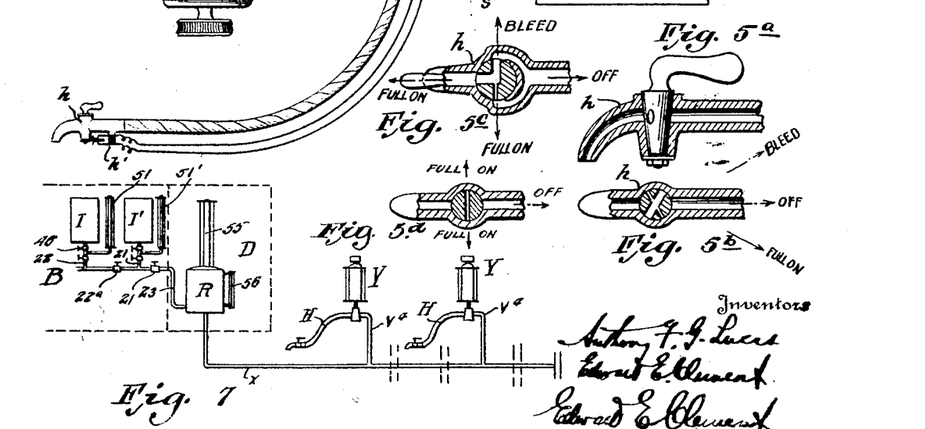
Fig. 7 is a diagram showing the connection between the parts of Fig. 4 and those of Figs. 5 and 6.

Fig. 7 is a diagrammatic illustration of the connections and and the drums, reservoir and discharge apparatus just described. The drums I and I' arranged with their sight tubes, individual cut-off valves etc., as described with reference to Fig. 14 are indicated by the dotted lines as being in store room B. From the drums, supply pipe 23 leads to the reservoir R which is at a lower level and in the separate (equipment) room D. The reservoir is equipped with the sight tubes 56 and 55 for indicating the amount of oil in the reservoir and in the entire system respectively, and has the other connections before described. From the bottom of the reservoir the oil line $x$ passes through the duct 20 (shown in Fig. 1) to the discharge apparatus indicated at Y and Y' of the construction just described with reference to Fig. 15, which are arranged so that their hose pipes H will reach the oil feed openings of cars over the several pits (as indicated by circles Y, Y' and $Y^2$ in Fig. 1).

Fig. 3 is a diagrammatic plan of the piping system showing the location of the lubricating as well as the heating apparatus. The supply chamber B, equipment room D, office C, heater room E, retiring rooms F—F' and the pits B in their respective places are indicated by dotted lines. The lubricant drums I—$I^n$ are shown in the supply chamber with pipes leading therefrom to the equipment chamber, where the heat medium may be controlled. From the equipment room the heating pipes are led through the building and through the duct 20 to the several pits and at the desired places in the system, radiating units are arranged connected to said pipes. At the several pits the lubricant pipes are provided with lead-off pipes, each adapted to supply the individual pit with a particular lubricant. It will be seen that the first three drums I, I', and $I^2$ are arranged the same as those of Figs. 4 and 7 and are adapted to supply the same grade of oil. The reservoir is located as in Fig. 4, and is indicated at R in the equipment chamber D, the lead-off pipe $x$ carrying the oil from the same through the duct 20. The supply tanks Y and hose arrangement are the same as that of Fig. 5 and are indicated diagrammatically at the circles T—T'—$T^2$, with lines showing the pipe connections to the lead pipes in the duct just mentioned, and the valve members therefor. The drums indicated at $I^3$ and $I^4$ are similarly connected to a common lead-off pipe, separate from the former so that these former may be used for a second grade of oil. They may have a reservoir (not shown) similar to that of the first three drums, and are connected at the pits with separate supply tanks T'. A third grade of oil may be supplied by the drums similar to the drums $I^5$ and $I^6$ connected to the supply tanks $T^2$; and in like manner any number of different grades of oil may be dispensed as desired. The two drums $I^n$ with their connections are for grease and are arranged and controlled as shown in Fig. 4, with the several cut off and control valves in the same places and with lead pipes passing through the equipment chamber and the duct (preferably separating into two parallel pipes while passing through the duct) and connected with the discharge hoses 31—32.

It will be noted that Figs. 1 and 3 supplement each other, Fig. 1 showing all the mechanical parts and Fig. 3 all the piping and connections. The two can be superposed and read together. We believe the arrangement shown in Fig. 1 and the organization of parts and connections shown in Fig. 3 to be new and original with us, and we shall claim the same accordingly. The following are the main features of advantage in this general arrangement: minimum handling of supplies; direct access to storage chamber for delivery and removal of empty drums; fireproof storage and handling of materials throughout the plant; supplies maintained at uniform temperature in all seasons throughout the entire system; waste materials of the plant utilized in heating the plant without handling; plant perfectly elastic and expansible unit by unit, by building and equipping new pits without changing any other features; maximum efficiency of labor due to heating of pits and labor saving devices; maximum efficiency in point of time in operation due to constant supply at point of application without any intermediate steps or lost motion by employers or apparatus; guaranteed purity and character of product applied to parts, due to continuous supply from original containers under perfect conditions of temperature and pressure; centralized control and supervision of entire plant, including quantities of materials used and relative proportions of different grades or kinds; individual metering of oil and grease applied to each car; metering of the general supply to all the pits; sight feed of engine lubricant and if desired of other lubricants for customers' inspection; automatic control of measured filling tanks or cylinders; automatic control of grease feed and oil feed from point of application or hose nozzles, whereby the operator's attention is confined to said point of application; perfect accessibility of all parts in the entire system, without interruption of functioning; minimum time and skill required in handling cars over the pits.

It is to be understood that while we have described and consider preferable in practice, sunken pits for the operators, over which the cars are run on the level, nevertheless the invention as a whole is not limited to the use of pits but may be applied to a system of frames or bridges, or any other type of car supports provided the principles of distribution, etc. are adhered to. We have presented herein the best form of embodiment of the invention known to us at the present time, but we are well aware that there may be numerous changes and additions or omissions from the system described, without departing from the spirit of our invention; and we desire it to be understood therefore that we contemplate all such changes and modifications as fall fairly within the scope of the appended claims or any of them; including all equivalents, whether specifically mentioned or not which if substituted for elements herein shown and described would satisfy good practice and perform the functions intended.

In claiming perfect accessibility of all parts of the equipment, it is pointed out that in the house A all the sources of supply, including heat are not only set and piped in the most convenient manner for handling and operation, but all means of control in the equipment room D are immediately accessible and centralized. From the building A to and through all the pits runs the duct or gutter 20, in which are laid all the pipes and distributing agencies, including electric light and power wires in flexible metal pipe, as usual. In the pits, covers 20$^c$ of wood or metal are provided, and between the pits are archways or tunnels 20$^a$, through which the covers 20$^c$, preferably in separate units, are extended. The end archway connects the first pit with the house, so that the supply pipes, steam pipes, electric wires, etc. are literally accessible throughout every inch of their length from the store room to the various pits. In this connection a word should be said concerning the lateral pipes shown in Fig. 3 leading to measuring tanks T—T'—T$^2$. There are three of these tanks shown, positioned between pits P and P', and three more positioned between P' and P$^2$, the idea being to supply different makes or grades of oil. By making the hose H (see Fig. 5) long enough, these supply tanks can be used interchangeably for either one of the adjacent pits. It is to be understood also that where a nozzle $h$ is used for filling oil cups throughout the length of a chassis there would have to be for this purpose either an additional oil hose in each pit with such a nozzle $h$, or another measuring tank with a hose H, located nearer to each pit. These are matters of detail which we leave to the judgment of the user, as they are within the scope of one skilled in the art. We wish to make it clear however that a hose H such as shown in Fig. 5 without the measuring tank T, may be attached directly to the supply pipe $v^4$, and in such case the hose should be provided with some limiting means whereby oil in quantities cannot be drawn from it without actuating a meter. Where the same hose is to be used for either quantity or "bleeding", a nozzle should be provided like those shown in Figs. 5$^a$, 5$^b$, 5$^c$ and 5$^d$. Figs. 5$^a$ and 5$^b$ show respectively a horizontal section through a faucet $h$ having a large passage and a small or bleeding passage through its turning plug. The handle is substantially the same as in Fig. 5 and the valve is closed when the handle is turned parallel with the pipe. When the handle in Figs. 5$^a$ or 5$^b$ is turned through 30 degrees in one direction it opens the large passage through turning plug and when turned in the other direction it opens a small or "bleeding" passage. The modification shown in Fig. 5$^c$ shows a different arrangement of passages. In this case the handle is shown full-on when pointing forward over the nozzle, and is also full-on 90 degrees from this position, turning counter-clockwise. When turned through 180 degrees or with the handle parallel to the hose, the valve is cut off, and turned through another 90 degrees the bleeding passage only is open. Fig. 5$^d$ shows a further modification in which the turning plug has only a bleeding passage so that oil can only be withdrawn from it in very small quantities and at a very slow rate. Such a nozzle would be satisfactory for direct connection to the oil pipes in the pit. The nozzle $h$ of Fig. 5 however, needs no modification, and the arrangement and location of the oil tanks in Fig. 3 will serve all purposes, if as usual, the ordinary oil can is employed to fill oil cups, this being in turn replenished from the tank when necessary.

Figs. 1$^a$ and 3$^a$ show some detail of the pits. The side walls 17 with their guard flanges 18 are preferably made integral with end walls and bottom lining 18$^a$ and 18$^b$. The bottoms 18$^b$ have a fall or slope from both ends toward the central duct or trough 20 sufficient to secure drainage. 21 are the pit radiators (see also Figs. 1 and 3), which are covered scribed are peculiarly applicable to what is known as "600W", which has been a standard lubricant for engines, particularly for steam engines for many years. This lubricant is a thick and viscous oil, having specifications such as to make it extremely desirable for motor vehicles except in one respect, that it is almost black in color and is very subject to oozing and leakage. By our present system, methods and apparatus, the use of 600W is rendered possible without leakage or fouling of the plant, or waste.

Referring now to Fig. 4, pipe 230 is supposed to lead along beneath the platform $b'$ of Fig. 2, and to a reservoir R which may be located in any convenient place, but must be at a lower level than the drums I—I'. The pipe 230 has valves 210 and 220, the branch pipes 210 and 220 leading to the respective drums. Each of these drums which are shown herein as standard for both oil and grease, is of rolled sheet steel in cylindrical form, stiffened by annular flanges and provided with countersunk heads, only one of which is made with an opening. This is in order to lessen the chances of refilling and resale of the drums by unauthorized persons, and to make it more difficult to remove oil or grease from the drums in transit or otherwise except in an authorized plant. The pipe 220 is fitted with a union coupling 44 by which a short section of tube 45 can be joined to the pipe 220 and thereby connect in the drum I. The section 45 is screwed into the tapped opening $i$ in the drum I and is provided with a valve 46. When this section of pipe is removed, the opening in the drum head is closed by means of a plug 47 secured to hasp 48 the end of which when the plug is secured in place, engages a riveted staple 49, whereby a padlock or a lead seal may be applied to prevent unauthorized removal of the plug 47. This plug may be sealed in place by other means if desired, the main object being to make the manufacturer of the grease responsible to the dealer who dispenses it, and the dealer in turn responsible for both himself and the manufacturer to the customer. This enables us to attain our object of guaranteeing the delivery to the customer of oil or grease exactly as it leaves the hands of the manufacturer, without contamination, adulteration or substitution.

The pipe 220 is provided with a lateral arm 49 containing a valve 50 and carrying the sight tube 51, the same being a graduated glass column carried in a frame 52 and when the valve 46 is open, indicating at all times the level of the oil in drum I, attached to its pipe 22. It should be noted that this pipe 220 also has a valve 53, and the pipe 210 has a similar valve 54 the purpose of which is to prevent drainage of the sight tubes when the drums are being changed, as well as to cut off the entire branch leading to any particular drum when necessary.

It will be observed in Fig. 2 that the pipes 23 connect the drums in pairs except the last three, which form a triplet. We have assumed that in the average plant two drums will be sufficient for each particular brand or quality of oil or grease, and with the arrangement shown in Fig. 4, it would be possible to use a single drum, since the reservoir R will always hold enough oil or grease to supply the pits while the drum I or I' is being changed. This reservoir R is common to as many drums as are connected to the same feed pipe 230, and is shown equipped with a sight tube indicator 55 for the entire system, and with a separate sight tube indicator 56 for itself. It will be observed that the upper ends of the several columns 51, 51' and 55 are open at the top, and each one is covered with a screen 57 to keep out foreign substances. This means that the system is worked at atmospheric pressure. As will presently appear, however, this may be varied, especially with respect to the grease or thick oil, while the light or thinner lubricating oils may be handled by the arrangement of Fig. 4.

Fig. 5 is a diagrammatic view of an automatic arrangement for supplying oil. The glass tank T is shown containing the oil and having graduations on its side for denoting the quantity of oil therein. It is connected by the pipe $t^6$ to the valve V shown in section. The valve plug $v$ is adapted to turn in the casing $v'$ so that the passage $v^2$ may connect the tank with either the nipple $v^3$ leading to the hose H or the nipple $v^4$ leading to a source of supply, which are arranged in opposite sides of the casing, and hereinafter more fully described. A stem $v^5$ is fixed in the plug so as to extend downwardly and turn the same. Near the top of the stem a worm gear $v^6$ is fixed and adapted to mesh with a worm $m^5$ on the shaft $m^4$ of a motor M so that the turning of the valve plug may be effected by the turning of the motor armature $m'$ either directly or in reverse. A reversing switch S is arranged below the valve and is shown pivoted at $s$ and having anchor arms $s'$ and $s^2$ adapted to be acted upon alternately by a cam projection $s^3$ which is actuated and controlled by the valve stem $v^5$. The movement of the motor and valve is controlled by means of the relay R which comprises an electromagnet $r$ and armature contacts $r'$ and $r^2$ included in series with the contacts of the reversing switch S and with a generator G for supplying current to the motor. The relay is energized from a battery $b$ in series therewith.

The tank T is shown partly broken away to show the float $t'$ having a stem $t^2$ extending vertically upwardly from the top of the same ber being arranged so as to hold a plurality of lubricant containing drums interconnected and adapted to be cut in or out of the system either individually or in combinations.

3. In a lubricating system for automobiles and the like, an enclosed chamber containing a source of supply of the lubricant, vehicle supporting means outside of said chamber, a conducting pipe extending from the source of supply in the enclosed chamber to said supporting means, and discharge means for said pipe at the supporting means, adapted to be applied to and feed lubricant directly from the source of supply into parts of the vehicle requiring the same, said supply chamber being arranged so as to hold a plurality of lubricant containing drums interconnected and adapted to be cut in or out of the system either individually or in combinations, together with means for removing and replacing the said drums individually as they are cut in or out of service without interrupting the flow of lubricant from other drums into the pipe supplied thereby.

4. In a lubricating system for automobiles and the like, a chamber containing a source of supply of lubricant, a conduit of small diameter extending from said chamber, discharge means for said lubricant outside of said chamber connected through said conduit by a lead-off pipe with the source of supply and a nozzle therefor adapted to be applied directly to a bearing on a vehicle, the said source of supply consisting of a metallic drum adapted to be removably connected with a stationary lead-off pipe member for passing the lubricant through said conduit from the chamber, without the possibility of tampering with the lubricant from the original source of supply to the dispensing nozzle.

5. A lubricant system comprising a closed chamber, a source of supply therein, a support for a vehicle, a common conduit of minimum diameter for both discharge and filling pipes, conducting means for the lubricant extending from said source of supply through said conduit to said support, heating means adapted to maintain said source of supply at a constant temperature and means extending through said conduit to preserve the temperature of the lubricant between said source and the vehicle support, said source of supply and said conducting means being inaccessible to an operator except through the discharge terminal thereof.

6. The lubricating system described in claim 5, with heating means in the closed chamber, in the conduit and at the vehicle support, adapted to maintain the lubricant at a predetermined temperature throughout the entire system, from the source of supply to the vehicle bearings.

7. In a lubricating system for vehicles, a source of oil supply and means for protecting the same from tampering, comprising an enclosure, a common conduit extending therefrom to the point of use, said conduit being of minimum diameter for both discharge and filling pipes, a run-off pipe or pipes connected to said source within said enclosure and extending through said conduit, and a measuring and dispensing device connected to said pipe and comprising the following instrumentalities: a container of determined capacity, a pipe connection from said container to said run-off or supply pipe, a discharge pipe connection from said container to a discharge nozzle, and means for controlling the connection of said pipe to said container and to said discharge pipe in alternation, said source of oil supply, run-off pipe, and dispensing device being inaccessible to an operator except through said discharge nozzle.

8. The lubricating system claimed in claim 7, in which a run-off pipe is provided within the supply enclosure with means for attaching it to a plurality of oil containers, and means for shutting off and attaching one or more of said chambers without interrupting the flow from others.

9. The lubricating system claimed in claim 7, in which a run-off pipe is provided within the supply enclosure with means for attaching it to a plurality of oil containers, and means for shutting off and attaching one or more of said chambers without interrupting the flow from others, the connection for each individual container being provided with a separate gauge, and the run-off tank being provided with a common intermediate reservoir, whereby a constant head or pressure and a constant supply may be maintained in the run-off pipe to the dispensing device, irrespective of the number of containers connected up in service.

10. The lubricating system claimed in claim 7, in which a run-off pipe is provided within the supply enclosure with means for attaching it to a plurality of oil containers, and means for shutting off and attaching one or more of said chambers without interrupting the flow from others, the connection for each individual container being provided with a separate gauge, and the run-off tank being provided with a common intermediate reservoir, whereby a constant head or pressure and a constant supply may be maintained in the run-off pipe to the dispensing device, irrespective of the number of containers connected up in service, said intermediate reservoir being also provided with a gauge common to all the containers.

11. A lubricating system comprising a receiving pipe line having a plurality of branch pipes each with double valves in tandem and a gauge connected between them, each branch pipe being adapted to be connected to an oil drum direct, and each gauge thereafter serving to indicate the height of oil in said drum, a run-off pipe extending from said receiving pipe to a point of consumption, and a dispensing device at said point of consumption comprising a measuring cylinder, a branch pipe therefrom to the run-off pipe, another branch pipe therefrom to a discharge nozzle, and valve means controlling said branch pipes.

12. A lubricating system and dispensing device for lubricating oil comprising the following instrumentalities: a source of supply connected to a valved feed pipe, a reservoir, a run-off pipe extending therefrom to a plurality of dispensing devices, each dispensing device consisting of a measuring container, a discharge nozzle and supply connection to the run-off pipe, with a valve for the container adapted to connect said discharge and supply pipes to said container alternatively, and means for metering the amount of oil passing through each container, said source of supply and all intermediate connections therefrom and thereto being inaccessible to an operator except on the discharge side of the dispensing device.

13. In a lubricating system, a common enclosure, a source of oil supply therein, a common conduit of minimum diameter for both discharge and filling pipes extending from said enclosure to one or more dispensing points, means within said enclosure for metering the summative consumption of oil, and means at each dispensing device for individually metering its own consumption, said dispensing device being connected to said source of supply through said conduit, whereby both the proprietor of the source of supply and the person or persons using the dispensing devices, are protected against loss, said source of supply and all intermediate connections therefrom and thereto being inaccessible to an operator except on the discharge side of the dispensing device.

In testimony whereof we hereunto affix our signatures.

ANTHONY F. G. LUCAS.
EDWARD E. CLEMENT.